United States Patent [19]

Miyazaki

[11] Patent Number: 4,963,925
[45] Date of Patent: Oct. 16, 1990

[54] CHROMA CONTROL METHOD

[75] Inventor: Koichi Miyazaki, Kanagawa, Japan

[73] Assignee: Fuji Xerox Co., Ltd., Tokyo, Japan

[21] Appl. No.: 355,614

[22] Filed: May 23, 1989

[30] Foreign Application Priority Data

May 24, 1988 [JP] Japan .................... 63-127615

[51] Int. Cl.⁵ .......................................... G03B 27/32
[52] U.S. Cl. ........................................ 355/77; 355/32; 355/35
[58] Field of Search .................... 355/38, 35, 32, 77

[56] References Cited

U.S. PATENT DOCUMENTS 4,687,334  8/1987  Miyakawa .......................... 355/77
4,872,034  10/1989  Ohta et al. .......................... 355/77

FOREIGN PATENT DOCUMENTS 61-179697  8/1986  Japan .

Primary Examiner—Monroe H. Hayes
Attorney, Agent, or Firm—Finnegan, Henderson, Farabow, Garrett, and Dunner

[57] ABSTRACT

The improved method of chroma control for use in a color image forming appartus such as a digital color copier comprises the steps of: reading information on a color original; transforming the density of each of three original colors, red, green and blue, to an associated hue, lightness and chroma; controlling said chroma; combining the controlled chroma with said hue and lightness; transforming the combinations to colorant densities; and outputting a color image based on said colorant densities. The method allows only chroma to be controlled without affecting hue and lightness, thereby enabling the user to copy color originals with the tone of the copy controlled as freely as he likes.

2 Claims, 4 Drawing Sheets

CHROMA CONTROL METHOD

BACKGROUND OF THE INVENTION

The present invention relates to color image forming devices such as digital color copiers. In particular, the present invention relates to a chroma control method that provides easy control for producing an output picture of a desired tone.

In a digital color copier, the image of the original is separated into three color components, red, green and blue, which are then transformed to colorant components, yellow, magenta and cyan, by matrix operations. Based on these trichromatic colorant components, a black colorant component for "black printing" is generated and eventually a yellow, a magenta, a cyan and a black colorant are deposited on receiving paper in amounts that are associated with the image of the original, thus producing a color copy.

Production of color copies involves more complicated optical and electrical processing than with monochromatic copies. Furthermore, any deviation from the original will be readily perceived by the eye, so that it is quite difficult to achieve faithful reproduction of the image of the original unless proper control is made. The situation is much more complicated since there are occasional needs to make copies with the tone of the original being deliberately altered. To meet this need, color copiers are furnished with special circuitry for controlling such parameters as density, saturation (chroma) and hue by altering the quantities, proportions and other variables of three color components (red, green and blue) or three colorant components (yellow, magenta and cyan).

A method for controlling chroma is described in the specification of Japanese Patent Application Unexamined Publication No. 61-179697. The method starts with determining the densities of three colors, red ($D_R$), green ($D_G$) and blue ($D_B$), and then determining their respective maximum, intermediate and minimum values, MAX, MID and MIN, which are expressed by:

$$MAX = max(D_R, D_G, D_B)$$

$$MID = mid(D_R, D_G, D_B)$$

$$MIN = min(D_R, D_G, D_B).$$

The thrust of this method lies in controlling chroma by altering the values of MAX and MID without changing the ratio of (MID−MIN)/(MAX−MIN).

This method, however, has had the problem that not only chroma but also lightness will vary since the densities of two colors are changed with the minimum density of the third color fixed. In order to avoid the variation in lightness, the value of MIN must also be changed but then the circuitry becomes complicated.

A method has also been employed to control chroma by directly altering the respective color components but in this method, too, unavoidable changes will occur not only in chroma but also in density and hue, thereby making it difficult to produce image of the intended tone. In another practice, various correction circuits are employed to insure that chroma control can be performed without influencing density and hue, but the points that need adjustment are so many that not only it is difficult to perform adjusting operations but also many years of experience are required to attain good results.

SUMMARY OF THE INVENTION

An object, therefore, of the present invention is to provide a method of chroma control that comprises the steps of: reading information on a color original; transforming the density of each of three original colors, red, green and blue, to an associated hue, lightness and chroma; controlling said chroma; combining the controlled chroma with said hue and lightness; transforming the combinations to colorant densities; and outputting a color image based on said colorant densities.

In the present invention, chroma may be expressed by a formula in which lightness and the color densities of red, green and blue are variables.

In the method of the present invention, each of the densities of three colors, red, green and blue, as obtained by reading information from a color original is first transformed to an associated hue, lightness and chroma. The respective transformations, for example, the one to hue, may be accomplished on the basis of the inequality of the three color densities and the amount of the difference between them. By approximations, visual densities and lightness values are successively determined from those color densities, and chroma is determined from the so calculated lightness and the given color density. Chroma is controlled appropriately in response to instructions from the operating panel, etc. and thereafter transformed back to colorant densities together with hue and lightness, with a color image being then reproduced on the basis of those colorant densities.

DETAILED DESCRIPTION OF THE INVENTION

The features of the present invention are described below in a specific way with reference to the accompanying drawings.

Figure 2:
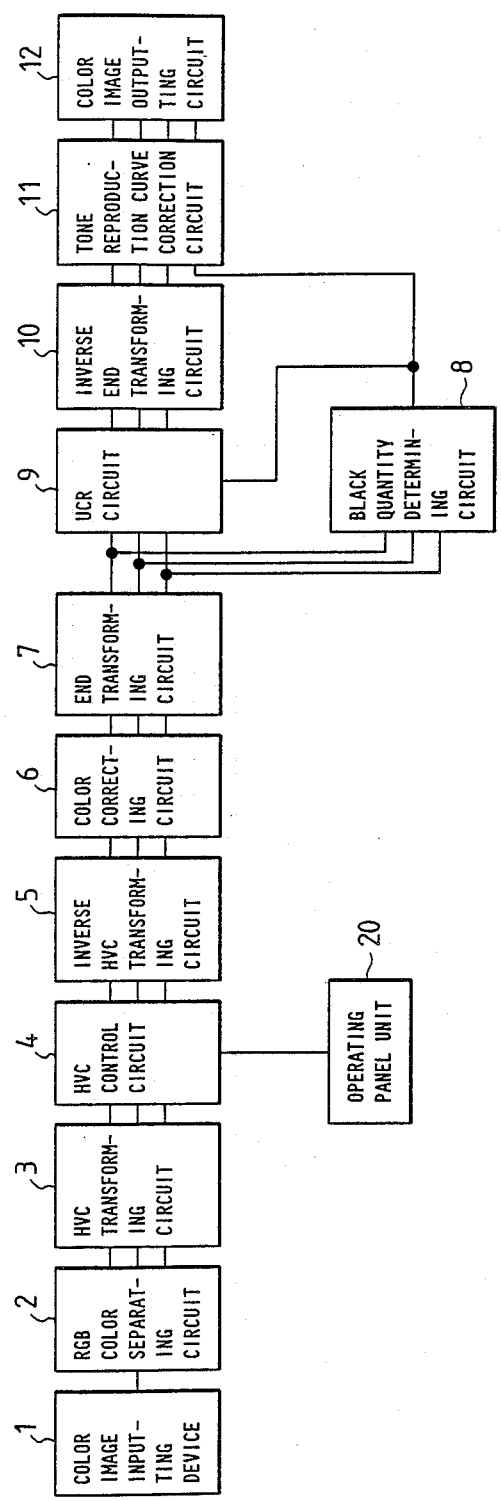
FIG. 2 is a block diagram showing the overall construction of a color copier to which the chroma control method of the present invention may be applied.

FIG. 2 is a block diagram showing the overall construction of a color copier to which the chroma control method of the present invention may be applied.

The output of a color image inputting device which reads information from a color original is supplied into a RGB color separating circuit 2, where it is transformed to a red, a green and a blue density Signal $D_R$, $D_G$ and $D_B$. These density signals are fed into a HVC transforming circuit 3 where each of these signals is transformed to a hue signal H, a lightness signal V and a chroma signal C. These signals H, V and C are supplied into a HVC control circuit 4. An operating panel unit 20 is connected to the HVC control circuit 4 and the hue, lightness and chroma signals H, V and C will be controlled in response to instructions from this operating panel unit 20.

Figure 3:
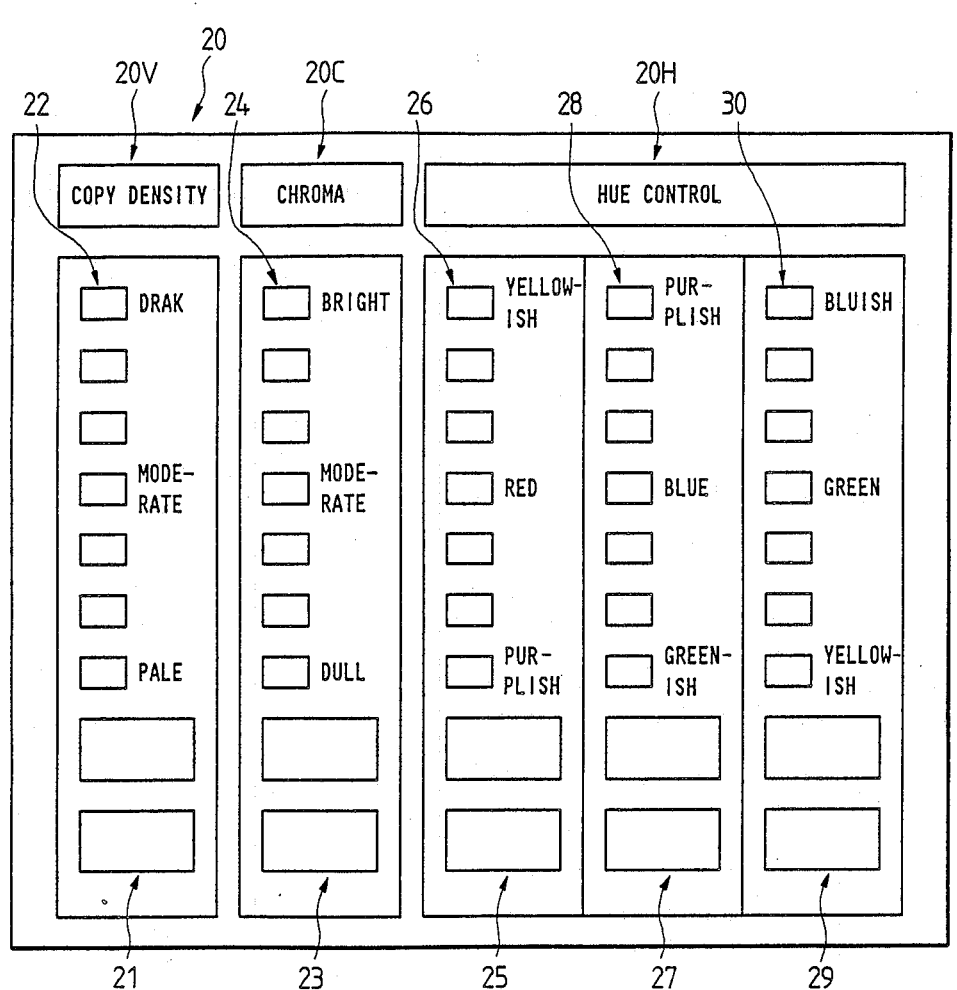
FIG. 3 is a front view of an illustrative operating panel.

An example of this operating panel unit 20 is described below with reference to FIG. 3. The operating panel unit 20 is equipped with a copy density control section 20V, chroma control section 20C and a hue control section 20H. When one of the copy density control keys 21 on the copy density control section 20V is depressed, lightness signal V is controlled in the HVC control circuit 4 while at the same time, the desired level of control is displayed on a copy density display lamp section 22.

Similarly, one of the chroma control keys 23 on the chroma control section 20C is depressed to control chroma signal C while at the same time, the desired level of control is displayed on a chroma display lamp section 24.

The hue control section 20H has a control terminal for each of red, blue and green colors. If one of the red hue control keys 25 is depressed, hues in the neighborhood of red are controlled while at the same time, the desired level of control is displayed on a red hue display lamp section 26. It is assumed here that a red color with either yellow or purple shade is obtained by depressing one of the red hue control keys 25. Essentially the same explanation will apply to blue hue control keys 27, blue hue display lamp section 28, green hue control keys 29 and green hue display lamp section 30.

Details of the HVC transforming circuit 3, HVC control circuit 4 and an inverse HVC transforming circuit 5 to be described just below will be given later in this specification.

Controlled hue, lightness and chroma signals H, V and C are fed into an inverse HVC transforming circuit 5, where they are transformed back to red, green and blue density signals, $D_R$, $D_G$ and $D_B$. These density signals are then fed into a color correcting circuit 6 where they are transformed to three colorant (yellow, magenta and cyan) density Signals $D_Y$, $D_M$ and $D_C$.

The colorant density signals $D_Y$, $D_M$ and $D_C$ are transformed to corresponding equivalent neutral density (END) signals in an END transforming circuit 7. From these END signals, a black signal for "black printing" is generated in a black quantity determining circuit 8. The black signal is subtracted from END signals for yellow, magenta and cyan in an under-color removal (UCR) circuit 9. The END signals are transformed back to respective colorant density signals $D_Y$, $D_M$ and $D_C$ in an inverse END transforming circuit 10. The resultant color density signals $D_Y$, $D_M$ and $D_C$, as well as the black signal from the black quantity determining circuit 8 are supplied into a tone reproduction curve correction circuit 11, where color correction matching the output characteristics of a color image outputting device 12 is accomplished. If the color image outputting device 12 is a laser printer and if gradation is to be expressed by the number of dots, tone reproduction curve correction is performed in such a way that density will change along a path on an S-shaped curve. Eventually, a yellow, a magenta, a cyan and a black colorant will be deposited on receiving paper in amounts that are associated with the image of the original, thus producing a color copy.

Figure 1:
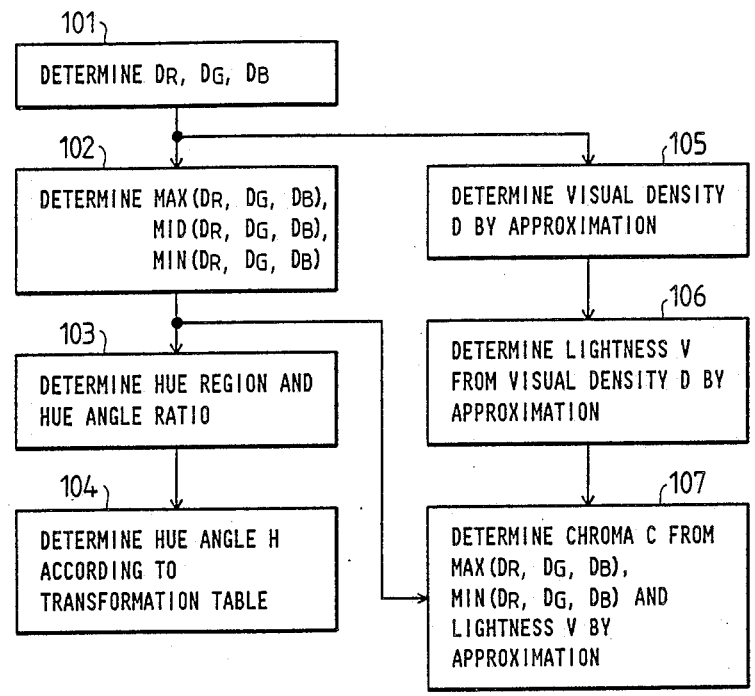
FIG. 1 is a flowchart showing the sequence of transforming color density to hue, lightness and chroma.

The procedures of controlling hue, lightness and chroma using the HVC transforming circuit 3, HVC control circuit 4 and inverse HVC transforming circuit 5 are described below in detail with reference to FIG. 1.

Hue control is to be discussed first. The following discussion is based on the fact that a position on the circle of hues can be determined from the inequality of color density Signals $D_R$, $D_G$ and $D_B$, and a hue angle H is approximated on the basis of density signals $D_R$, $D_G$ and $D_B$. For the sake of simplicity, signal name and signal value or hue angle are to be designated by identical symbols.

The procedures of approximation by the expression of reflectance are first considered. Let reflectance signals for red, green and blue be written as $R_R$, $R_G$ and $R_B$ and arrange them in the decreasing order of their value. In Other words, max($R_R$, $R_G$, $R_B$), mid($R_R$, $R_G$, $R_B$) and min($R_R$, $R_G$, $R_B$) are determined (see Steps 101 and 102 in FIG. 1).

If $R_R > R_G > R_B$, then max($R_R$, $R_G$, $R_B$) = $R_R$, mid($R_R$, $R_G$, $R_B$) = $R_G$ and min($R_R$, $R_G$, $R_B$) = $R_B$. In the discussion that follows, max($R_R$, $R_G$, $R_B$), mid($R_R$, $R_G$, $R_B$) and min($R_R$, $R_G$, $R_B$) are simply expressed as max, mid and min, respectively. The symbol "min" denotes a white component. Hence, a combination of (max−min) and (mid−min) each obtained by excluding the white component will indicate the position of a certain hue in the circle of hues, or in which of the hue regions $R_Y$, $G_Y$, $G_C$, $B_C$, $B_M$ and $R_M$ divided by six hue axes for red, yellow, green, cyan, blue and magenta the hue of interest will be located. The six hue axes are located at respective angles of 0, 60, 120, 180, 240 and 300 degrees.

The relationship between the inequality of the reflectances of red, green and blue colors and the associated hue regions is shown in Table 1 below.

TABLE 1

| Inequality of reflectances | Hue region |
| --- | --- |
| $R_R < R_G < R_B$ | $R_Y$ (red to yellow axis) |
| $R_G < R_R < R_B$ | $G_Y$ (yellow to green axis) |
| $R_G < R_B < R_R$ | $G_C$ (green to cyan axis) |
| $R_B < R_G < R_R$ | $B_C$ (cyan to blue axis) |
| $R_B < R_R < R_G$ | $B_M$ (blue to magenta axis) |
| $R_R < R_B < R_G$ | $R_M$ (magenta to red axis) |

If the hue angle ratio Hr is defined by:

$$Hr = \frac{mid - min}{max - min} \qquad (1)$$

then Hr will vary over the range of from 0 (when a hue is on the red, green or blue axis) to 1 (when it is on the yellow, cyan or magenta axis). Therefore, by examining the inequality of the values of reflectance signals $R_R$, $R_G$ and $R_B$, one is able to determine in which of the six hue regions a certain hue is located. Furthermore, hue angle H can be related to angle ratio Hr by the equation H = F(Hr) (see Step 103 in FIG. 1), where function F is expressed as follows:

$$H = F(Hr) = \begin{cases} 60 \times Hr & \text{(region } R_y\text{)} \\ 120 - 60 \times Hr & \text{(region } G_y\text{)} \\ 120 + 60 \times Hr & \text{(region } G_C\text{)} \\ 240 - 60 \times Hr & \text{(region } G_C\text{)} \\ 240 + 60 \times Hr & \text{(region } B_M\text{)} \\ 360 - 60 \times Hr & \text{(region } R_M\text{)} \end{cases}$$

In the next step, the so defined hue angle H is transformed to a Munsell hue according to the transformation key shown in Table 2 (Step 104). The hue angles calculated by the operations outlined above are not always in exact correspondence to hue angles on the circle of Munsell hues and hence need to be corrected. Intermediate angles may be determined by interpolation.

TABLE 2

| Key No. | Defined angle (degree) | Munsell system hue | hue angle (degree) |
|---|---|---|---|
| 0 | −2.64 | 10RP | −18 |
| 1 | 7.80 | 5R | 0 |
| 2 | 20.28 | 10R | 18 |
| 3 | 31.14 | 5YR | 36 |
| 4 | 42.66 | 10YR | 54 |
| 5 | 52.50 | 5Y | 72 |
| 6 | 60.72 | 10Y | 90 |
| 7 | 77.16 | 5GY | 108 |
| 8 | 113.64 | 10GY | 126 |
| 9 | 155.10 | 5G | 144 |
| 10 | 168.42 | 10G | 162 |
| 11 | 181.02 | 5BG | 180 |
| 12 | 190.50 | 10BG | 198 |
| 13 | 197.82 | 5B | 216 |
| 14 | 204.00 | 10B | 234 |
| 15 | 214.86 | 5PB | 252 |
| 16 | 249.60 | 10PB | 270 |
| 17 | 288.00 | 5P | 288 |
| 18 | 324.72 | 10P | 306 |
| 19 | 342.30 | 5RP | 324 |
| 20 | 357.36 | 10RP | 342 |
| 21 | 367.80 | 5R | 360 |

The approximation by the expression of reflectance is then transformed to approximation by density. If density is written as Di and reflectance as Ri, then $D_i = -\log_{10} R_i$. If One regards the density as an expression of absorbance Ai ($=1-R_i$), the hue angle ratio Hr in terms of density can be defined by the following equation with reference to equation (1):

$$Hr = \frac{\max(D_R, D_G, D_B) - \mathrm{mid}(D_R, D_G, D_B)}{\max(D_R, D_G, D_B) - \min(D_R, D_G, D_B)}$$

This hue angle ratio Hr will vary in the same way as in the approximation by the expression of reflectance. In the description that follows, $\max(D_R, D_G, D_B)$, $\mathrm{mid}(D_R, D_G, D_B)$ and $\min(D_R, D_G, D_B)$ are simply expressed as max, mid and min, respectively.

Division into hue regions and the approximation of hue angles by function F may also be effected as in the case of approximation by the expression of reflectance.

Figure 4:
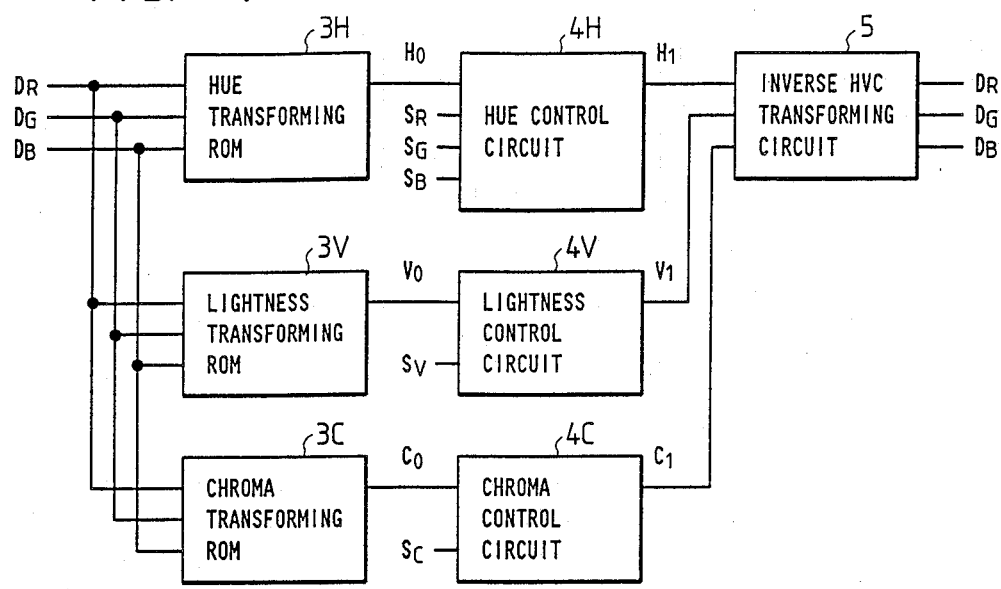
FIG. 4 is a block diagram of a HVC control circuit and associated circuitry.

In order to determine the hue angle H described above, trichromatic density signals $D_R$, $D_G$ and $D_B$ from the RGB color separating circuit 2 are supplied into the hue transforming ROM 3H shown in FIG. 4. The hue transforming ROM 3H is a look-up table that receives the trichromatic density signals $D_R$, $D_G$ and $D_B$ and which outputs hues as calculated by the operations described above. Hence, a hue signal $H_0$, typically a 6-bit signal, may be produced from the hue transforming ROM 3H in accordance with the trichromatic density signals $D_R$, $D_G$ and $D_B$.

The hue signal $H_0$ is supplied to a hue control circuit 4H. The hue control circuit 4H performs a designated hue angle control independently for each of the red, green and blue regions and is composed of a ROM configured like a look-up table. The hue control circuit 4H receives hue signal $H_0$, red region control signal $S_R$, green region control signal $S_G$ and blue region control signal $S_B$ and is capable of controlling hues within the range of hues shown in Table 3 below.

TABLE 3

| | Red region | | Green region | | Blue region | |
|---|---|---|---|---|---|---|
| | Lower limit | Upper limit | Lower limit | Upper limit | Lower limit | Upper limit |
| Munsell | 10P ~ | 10YR | 10Y ~ | 5BG | 5BG ~ | 10PB |
| hue angle | −54 ~ | 54 | 90 ~ | 180 | 180 ~ | 270 |
| 6-Bit expression | −10 ~ | 10 | 16 ~ | 32 | 32 ~ | 48 |

If an input hue angle H falls within any one of the three regions specified above, it can be controlled according to the relation $H_1 = H_0 + 2 \times f_H$, where $H_1$ is the controlled hue angle and $f_H$ is the control factor. Control factor $f_H$ corresponds to the region control signals $S_R$, $S_G$ and $S_B$ produced upon depressing hue control keys 25, 27 and 29 on the operating panel unit 20 shown in FIG. 3 and may be correlated to control levels "0"–"6" as shown in Table 4 below.

TABLE 4

| Control level | 0 | 1 | 2 | 3 | 4 | 5 | 6 |
|---|---|---|---|---|---|---|---|
| Control factor | +3 | +2 | +1 | 0 | −1 | −2 | −3 |

In Table 4, control factor "+3" refers to maximum clockwise rotation on the hue circle, which produces a yellowish hue in the red region, and control factor "−3" refers to maximum counterclockwise rotation on the hue circle, which produces a purplish hue in the red region.

As described on the foregoing pages, in the case under consideration, hue control is to be performed only when a hue of interest is within a specified hue region and the hue control actually effected is limited to that particular hue region. Hence, only the hue of interest can be controlled without affecting any other hues.

We now describe the procedures for lightness control. In the case under consideration, visual density D is determined from trichromatic density signals $D_R$, $D_G$ and $D_B$ by the following approximation (Step 105):

$$\begin{aligned} D &= a_1 \times D_R + a_2 \times D_G + a_3 \times D_B \\ &= 0.5 \times D_R + 0.45 \times D_G + 0.05 \times D_B \end{aligned}$$

From this visual density D, lightness V is determined by the following approximation (Step 106):

$$V = 10^{(1-\frac{D}{\beta})}$$

where $\beta$:2.362.

These operations for approximation are performed by the lightness transforming ROM 3V shown in FIG. 4. The value of $\beta$ is not limited to 2.362 and satisfactory approximation of lightness V can be obtained if $2.30 \leq \beta \leq 2.45$.

The lightness transforming ROM 3V is a look-up table that receives trichromatic density signals $D_R$, $D_G$ and $D_B$ and outputs the lightness value calculated by the operations described above. Hence, the lightness transforming ROM 3V generates a lightness signal $V_0$ in accordance with trichromatic density signals $D_R$, $D_G$ and $D_B$.

The lightness signal $V_0$ is supplied to a lightness control circuit 4V. The lightness control circuit 4V is composed of a ROM configured like a look-up table. This circuit performs mathematic operations in such a way that the input lightness $V_0$ will satisfy the following relationship with the output lightness $V_1$:

$$V_1 = a \times V_0^2 + b \times V_0 + c$$
$$= \frac{(4 - f_V)}{18} V_0^2 + \frac{11 f_V - 26}{18} V_0 + \frac{10(4 - f_V)}{18}$$

where $F_V$ is the control factor that corresponds to a copy density control signal $S_V$ sent from the copy density control section 20V. By varying $F_V$ over the range of from "2.5" to "5.5", the lightness V can be controlled, which eventually results in the control of copy density.

Lastly, we describe the procedures of chroma control. In the case under discussion, the chroma C is determined from the previously obtained maximum and minimum density values (max and min) and lightness V by the following approximation (Step 107):

$$C = \gamma \times V \times (max - min)$$

where $\gamma$:2.44.

The operation for this approximation is performed by the chroma transforming ROM 3C shown in FIG. 4. The value of $\gamma$ is not limited to 2.44 and the chroma C can be approximated satisfactorily if $2.30 \leq \gamma \leq 2.60$.

The chroma transforming ROM 3C is a look-up table that receives trichromatic density signals $D_R$, $D_G$ and $D_B$ and outputs the chroma calculated by the operation described above. Hence, the chroma transforming ROM 3C will generate a chroma signal $C_0$ in accordance with the trichromatic density signals $D_R$, $D_G$ and $D_B$.

The chroma signal $C_0$ is supplied to a chroma control circuit 4C. The chroma control circuit 4C is composed of a ROM configured like a look-up table. This circuit performs mathematic operations in such a way that the input chroma $C_0$ will satisfy the following relationship with the output chroma $C_1$:

$$C_1 = \frac{f_C}{8} \times C_0$$

where $f_C$ is the control factor that corresponds to a chroma control signal $S_C$ sent from the chroma control section 20C. By varying $f_C$ over the range of from "5" to "11", the chroma C can be controlled.

As described above, in the case under consideration, density information is first transformed to chroma information and after being controlled, the chroma information is transformed back to density signals in combination with hue and lightness information by the procedures to be described below. Thus, the hue and lightness information is maintained and kept intact even if chroma control is effected.

The hue, lightness and chroma signals $H_1$, $V_1$ and $C_1$ that have been obtained by the control procedures described above are then supplied into the inverse HVC control circuit 5 where they are transformed back to red, green and blue density signals $D_R$, $D_G$ and $D_B$ by the following procedures.

First, density D is determined from lightness V while at the same, the value of (max−min) is determined from lightness V and chroma C. In addition, hue angle H is subjected to inverse transformation with reference being made to the associated look-up table, so as to obtain hue angle ratio Hr:

$$Hr = \frac{max - mid}{max - min}$$

and hue region information. The value of (max−mid) is also determined from (max−min) and hue angle ratio Hr.

For each hue region, the density D is related to max, mid and min as shown in Table 5 below.

TABLE 5

| Region | max | mid | min | Density D |
|--------|-----|-----|-----|-----------|
| $R_Y$ | $D_B$ | $D_G$ | $D_R$ | $\alpha_1$ min + $\alpha_2$ mid + $\alpha_3$ max |
| $Y_G$ | $D_B$ | $D_R$ | $D_G$ | $\alpha_1$ mid + $\alpha_2$ min + $\alpha_3$ max |
| $G_C$ | $D_R$ | $D_B$ | $D_G$ | $\alpha_1$ max + $\alpha_2$ min + $\alpha_3$ mid |
| $C_B$ | $D_R$ | $D_G$ | $D_B$ | $\alpha_1$ max + $\alpha_2$ mid + $\alpha_3$ min |
| $B_M$ | $D_G$ | $D_R$ | $D_B$ | $\alpha_1$ mid + $\alpha_2$ max + $\alpha_3$ min |
| $M_R$ | $D_G$ | $D_B$ | $D_R$ | $\alpha_1$ min + $\alpha_2$ max + $\alpha_3$ mid |

Hence, max, mid and min can be determined for each hue region from the values of density D, (max−min) and (max−mid), together with their correspondence to $D_R$, $D_G$ and $D_B$. To take the hue region $R_Y$ ($D_B > D_G > D_R$) as an example, transformation may be performed as follows:

$$\begin{bmatrix} D \\ max - min \\ max - mid \end{bmatrix} = \begin{bmatrix} \alpha_1 & \alpha_2 & \alpha_3 \\ -1 & 0 & +1 \\ 0 & -1 & +1 \end{bmatrix} \begin{bmatrix} min \\ mid \\ max \end{bmatrix}$$

The min, mid and max thus obtained are assigned to each color density on the basis of the previously determined hue region information. Thus, the hue, lightness and chroma signals H, V and C are transformed back to the red, green and blue density signals $D_R$, $D_G$ and $D_B$, which are thereafter supplied to the color correcting circuit 6.

Figure 5:
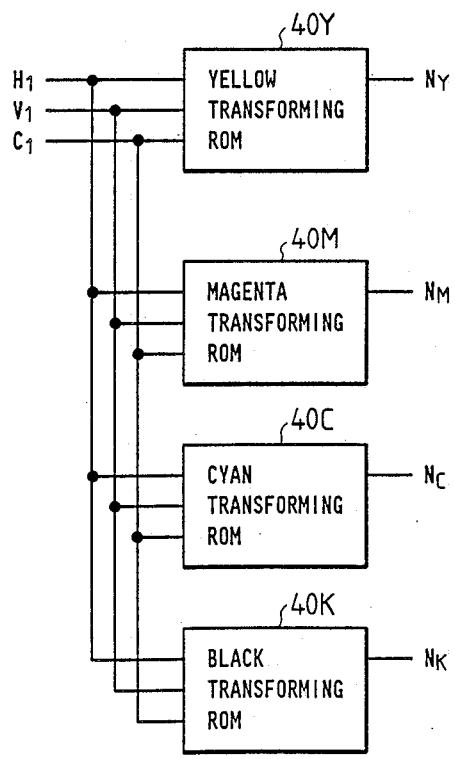
FIG. 5 is a block diagram showing ROMs of look-up table configuration that are supplied with hue, lightness and chroma signals to produce direct outputs indicating the numbers of dots for the respective colorants that are to be used in a color image outputting device.

For facilitating understanding on the side of the reader, the foregoing description assumes separation into blocks by function. In practice, however, the circuitry extending from the inverse HVC transforming circuit 5 to the tone reproduction curve correction circuit 11 is composed of ROMs 40Y, 40M, 40C and 40K as shown in FIG. 5, which are look-up tables for yellow, magenta, cyan and black colorants, respectively. In other words, each of the tables is capable of performing all of the necessary operations in an integrated form and receives the hue, lightness and chroma signals $H_1$, $V_1$ and $C_1$ as inputs. These tables will directly output the numbers of dots $N_Y$, $N_M$, $N_C$ and $N_K$ for the respective yellow, magenta, cyan and black colorants that are to be used in the color image outputting device 12. Thus, density signals and other relevant information are not generated as actual circuit outputs in the circuitry extending from the inverse HVC transforming circuit 5 to the tone reproduction curve correction circuit 11 but they are stored as coefficients in the associated tables. The term "colorant signals" as used herein covers not only analog signals that vary continuously in direct response to density but also the number of dots to be used in the color image outputting device 12.

As described on the foregoing pages, in the method of the present invention, color density information for red, green and blue that has been obtained by reading a color original is first transformed to hue, lightness and chroma information and after the chroma is controlled, it is combined with the hue and lightness information and transformed back to colorant densities. Thus, selective control of chroma can be accomplished without affecting hue and lightness, thereby enabling the user to copy color originals with the tone of the copy controlled as freely as he likes.

What is claimed is:

1. A method of chroma control comprising the steps of:
   reading information on a color original;
   transforming the density of each of three original colors, red, green and blue, to an associated hue, lightness and chroma;
   controlling said chroma;
   combining the controlled chroma with said hue and lightness;
   transforming the combinations to colorant densities; and
   outputting a color image based on said colorant densities.

2. A method of chroma control according to claim 1 wherein said chroma is expressed by the following equation:

$$C = 2.44 \times V \times \{max(D_R, D_G, D_B) - min(D_R, D_G, D_B)\}$$

where
   $C$ : chroma
   $V$ : lightness and expressed by $$V = 10^{(1 - \frac{D}{2.362})}$$

(where D is the visual density expressed by $D = \alpha_1 \times D_R + \alpha_2 \times D_G + \alpha_3 \times D_B$
where $\alpha_1$, $\alpha_2$ and $\alpha_3$ are coefficients)
   $D_R$ : the color density of red
   $D_G$ : the color density of green
   $D_B$ : the color density of blue.

* * * * *